Jan. 11, 1955   G. A. LYON   2,699,359
WHEEL COVER
Filed Sept. 9, 1949
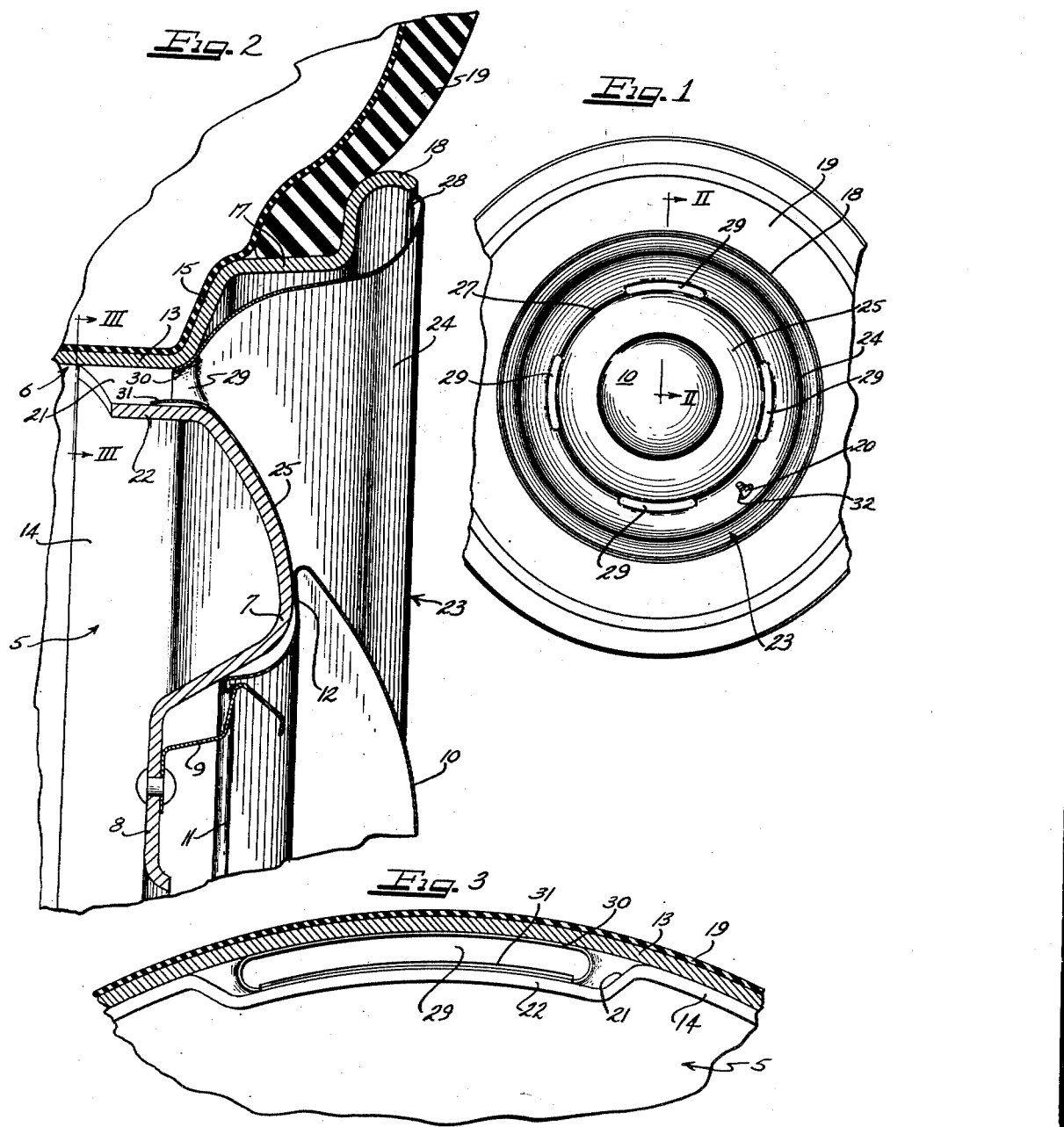
Inventor
GEORGE ALBERT LYON
by The Firm of Charles W. Hills, Attys.

United States Patent Office 2,699,359
Patented Jan. 11, 1955

2,699,359
WHEEL COVER

George Albert Lyon, Detroit, Mich.

Application September 9, 1949, Serial No. 114,705

2 Claims. (Cl. 301—37)

The present invention relates to improvements in wheel structures and more particularly concerns the ornamental and protective covering of the outer sides of vehicle wheel structures.

An important object of the present invention is to provide an improved wheel structure wherein the outer side of the wheel is protectively and ornamentally covered by a cover structure which has brake drum air circulation openings therein registering with the openings in the wheel body and including means engageable within the wheel body openings for retaining the cover on the wheel.

Another object of the invention is to provide an improved wheel cover having reinforced openings registering with wheel openings for brake drum air circulation therethrough and provided with improved means for retaining the cover on the wheel by engagement within the wheel openings.

According to the general features of the present invention there is provided in a wheel structure including a multi-flange tire rim and a wheel body having air circulation openings adjacent to the tire rim, a cover for the outer side of the wheel including a cover body substantially concealing the tire rim and at least an adjacent portion of the wheel body and having apertures generally registering with the wheel body openings, said apertures in the cover being defined by reinforcing generally axially inwardly extending flanges which extend into the wheel openings, the cover flanges on one side of the wheel openings comprising turned retaining lips engageable in resilient gripping relation with the contiguous wheel portion for retaining the cover on the wheel.

According to other general features of the invention there is provided a wheel cover for the outer side of a vehicle wheel including a tire rim and a wheel body having wheel openings adjacent the tire rim, the cover comprising a body portion for substantially covering the outer side of the tire rim and at least an adjacent portion of the wheel body and having a series of apertures therein to register with the wheel openings, each of said apertures being defined by a generally axially inwardly extending flange, said flange having a portion at one side thereof extending beyond the remainder of the flange and turned generally radially at its extremity for retaining wedging engagement with a contiguous portion of the wheel.

Other objects, features and advantages of the present invention will be readily apparent from the following detailed description of a preferred embodiment thereof taken in view of the accompanying drawings in which:

Figure 1 is an outer side elevational view of a vehicle wheel structure embodying the features of the present invention;

Figure 2 is an enlarged fragmentary radial sectional view taken substantially on the line II—II of Figure 1; and Figure 3 is a fragmentary sectional view showing certain parts in rear elevation, taken substantially on the line III—III of Figure 2.

As shown on the drawings:

A vehicle wheel with which the present invention is adapted to be used comprises a wheel body 5 and a tire rim 6, both of which are adapted to be made from appropriate gauge sheet metal, the body portion being preferably stamped to form and the tire rim being a rolled section.

The wheel body 5 comprises a generally axially protruding annular reinforcing intermediate nose bulge 7 defining a central inset bolt-on flange 8 which carries appropriate spring clips 9 which serve to retain in snap-on, pry-off relation, a hub cap 10 having an underturned reinforcing attachment flange 11 and including a flange portion 12 which is of a radial extent to seat against the nose bulge 7.

The tire rim 6 includes a base flange 13 against which an annular marginal attachment flange 14 of the wheel body is attached as by means of welding or riveting. Extending from the base flange 13 is a generally radially extending side flange 15 merging with an intermediate generally axially outwardly extending flange 17 and which in turn merges with a terminal flange 18, all of the flanges cooperating to define a drop center multi-flange structure adapted to support a pneumatic tire and tube assembly 19, a valve stem 20 being provided for inflation of the tire tube assembly.

For purpose of promoting circulation of cooling air about and past the brake drum with which the wheel may be associated, the wheel body 5 is provided with a series of openings 21 which are preferably formed by means of inset portions 22 of the wheel body peripheral flange 14 so that substantial openings are afforded between the inset flange portions 22 and the adjacent opposing portion of the tire rim base flange 13.

For the purpose of ornamentally and protectively covering the outer side of the wheel between the terminal flange 18 of the tire rim and the hub cap 10, an annular cover member 23 is provided. This cover member is preferably formed from appropriate gauge thin sheet material, such as sheet metal, although it may also be formed from sheet plastic if desired.

The cover member 23 is preferably formed in general simulation of the outer side of the vehicle wheel, but of a smoothly formed cross-sectional contour which is substantially more attractive than the multi-flange, generally stepped outer appearance of the tire rim 6. Furthermore, the smooth exterior of the cover member 23 is substantially easier to keep clean than the flanged, multi-grooved and creviced outer side of the tire rim and juncture between the tire rim and the wheel body. To this end, the outer side of the cover member 23 includes a tire rim concealing trim ring portion 24 and a wheel body covering portion 25, the two portions of the cover converging at a juncture 27 which provides a generally axially inwardly extending reinforcing rib and also defines a generally axially outwardly opening groove generally simulative of the groove between the tire rim and the nose bulge 7 of the wheel body.

The trim ring section 24 is preferably formed on a generally ogee contour with the radially outermost portion convex and the radially innermost portion concave, the radially outer edge being curled under to provide a marginal reinforcing bead 28. The inner annular cover portion 25 is preferably formed convexly generally complementary to the wheel body and more particularly the radially outer side of the nose bulge 7 so as to lie snugly against the nose bulge and the radially inner extremity of the portion 25 is of an internal diameter smaller than the external or extremity diameter of the hub cap 10 so that in full assembly the inner margin of the cover member 23 is clamped against the nose bulge 7 by the hub cap 10.

For retaining the cover member 23 on the wheel even when the hub cap 10 is removed, retaining means are provided in association with a series of air circulation openings 29 which are formed in the juncture portion 27 of the cover to register with the wheel openings 21 for air circulation through the cover. The air circulation openings 29 are equal in number to the air circulation openings 21 in the wheel. Each of the openings, or apertures 29 of the wheel cover is defined by a generally axially inwardly extending locating and reinforcing flange 30. By preference the flange 30 comprises all of the material of the cover struck out to provide the associated circulation aperture 29, such material being drawn and pressed axially inwardly to form a continuous flange defining the opening and to extend into the associated wheel opening 21 substantially as shown. For this purpose the cover apertures 29 are formed generally corresponding to the shape of the wheel openings 21, that is formed of generally kidney-shape or arcuately elongated on a common circle and in appropriately spaced relation.

In order to have the cover held to the wheel by the cover opening flanges 30, the radially outer side portions of the flanges 30 are formed to engage in generally complementary relation at the radially outer sides of the wheel openings 21 defined by the tire rim base flange 13 and at juncture of such flange with the side flange 15, while the radially inner portions of the flanges 30 are formed to effect resilient, retaining gripping engagement with the inset flange portions 22 of the wheel body. To this end, the radially inner portions of the flanges 30 are formed as axially inwardly extended lips or flange portions 31 which are preferably of bowed axial cross-section and also are bowed longitudinally to follow the curvature of the inset flange portions 22, as best seen in Figure 3, with the terminal edges of the respective retaining flange portions 31 directed generally radially inwardly for retaining gripping engagement with the contiguous inset body flange portions 22. As best seen in Figure 2, the construction and arrangement is such that in the assembled relation of the cover with the wheel the inner terminal edge portions of the retaining flanges 31 engage the wheel body inset flange 22 with generally line contact retaining gripping resilient pressure, with the remainder of the retaining flanges 31 bowed radially outwardly relative to the body flange portions 22. This is accomplished by having the radial or narrow dimension of the cover openings 29 as defined by the flange 30 somewhat narrower than the radial dimension of the wheel openings 21, while the inner terminal retaining flange extension 31 projects generally axially and radially inwardly to a slightly smaller diameter than the diameter defined by the radially outer surfaces of the wheel body inset flange portions 22. Thus, when the cover is to be applied to the wheel, the flange portions 30 are generally registered with the mouths of the wheel openings 21 and with the retaining flange lips 31 bearing against the wheel body inset flange 22, and the cover is pushed inwardly until the cover seats against the wheel and the flange 30 is in register at each of the wheel openings 21 with the retaining flanges 31 in retaining gripping cover-centering relation within the wheel openings. The hub cap 10 can then be applied to the outer side of the wheel to clamp the inner margin of the cover 23 against displacement. To remove the cover 23 the hub cap 10 is removed and then the cover 23 can be pried free from the wheel.

In order to accommodate the valve stem 20, the wheel cover and more particularly the outer section 24 thereof is formed with a valve stem clearance aperture 32. Since in the normal construction of vehicle wheels of this type, the valve stem is located intermediate a pair of the wheel openings 21, similar location of the valve stem aperture 32 in the cover is provided for. However, in the manufacture of vehicle wheels it is necessary to afford substantial tolerance with respect to placement of the valve stem aperture since it is practically impossible to have exact registration of the valve stem aperture with respect to the wheel body openings 21, but a certain tolerance in the location of the valve stem aperture must be allowed. To accommodate this tolerance and enable exact registration of the valve stem aperture 32 in the cover with the valve stem 20, the cover air circulation apertures 29 are made somewhat shorter than the wheel openings 21 and the ends of the reinforcing flange 30 therefore will clear the end walls defining the wheel openings 21 in the mounted position of the cover so as to afford substantial rotary tolerance in mounting the cover. The clearance relationship between flange 30 and the ends of the wheel apertures 21 is best shown in Figure 3.

It will be understood that modifications and variations may be effected without departing from the scope of the novel concepts of the present invention.

I claim as my invention:

1. In a wheel structure including a multi-flange tire rim including a base flange and a load sustaining body portion having an attachment flange secured to said base flange and inset at intervals to provide air circulation openings at the juncture with the tire rim, an annular cover member having divergent portions, the radially inner of which overlies the wheel body and the radially outer of which overlies the tire rim and with the juncture of the portions overlying the wheel openings, said juncture having air openings therethrough for registration with the wheel openings, and an integral lip extending axially inwardly at one radial side of the cover openings and having a tip directed generally radially into tensioned retaining engagement with the contiguous opposing radially facing surface defining the wheel opening, engagement of said tip against said surface being intermediate the axially opposite ends of said surface.

2. In a wheel structure including a multi-flange tire rim including a base flange and a load sustaining body portion having an attachment flange secured to said base flange and inset at intervals to provide air circulation openings at the juncture with the tire rim, an annular cover member having divergent portions, the radially inner of which overlies the wheel body and the radially outer of which overlies the tire rim and with the juncture of the portions overlying the wheel openings, said juncture having air openings therethrough for registration with the wheel openings, said wheel body openings being defined by inturned respective flanges completely encompassing the associated opening and extending into the registering wheel opening, the cover member having a valve stem aperture, the length of the cover openings circumferentially of the cover and the encompassing cover flanges being substantially less than the length of the wheel openings considered circumferentially of the wheel so as to permit rotary adjustment of the cover for registration of the valve stem aperture with the valve stem of the wheel, and an integral lip extending axially inwardly from one radial side of the flanges encompassing the cover openings and having a tip directed generally radially into tensioned retaining engagement with the contiguous opposing radially facing surface defining the wheel opening, engagement of said tip against said surface being intermediate the axially opposite ends of said surface.

References Cited in the file of this patent

UNITED STATES PATENTS

| Number | Name | Date |
| --- | --- | --- |
| 2,231,931 | Lyon | Feb. 18, 1941 |
| 2,279,330 | Lyon | Apr. 14, 1942 |
| 2,386,244 | Lyon | Oct. 9, 1945 |
| 2,406,390 | Lyon | Aug. 27, 1946 |
| 2,426,109 | Lyon | Aug. 19, 1947 |